April 16, 1929.   G. W. PEDLEY   1,709,229
WIND WHEEL
Filed March 28, 1928

Witness
DEBovey

Inventor
George W. Pedley
by Bair & Freeman Attorneys

Patented Apr. 16, 1929.

1,709,229

UNITED STATES PATENT OFFICE.

GEORGE W. PEDLEY, OF ALGONA, IOWA.

WIND WHEEL.

Application filed March 28, 1928. Serial No. 265,273.

The object of my invention is to provide a wind wheel of simple, durable and comparatively inexpensive construction.

A further object of my invention is to provide a wind wheel of the character herein disclosed in which a series of vertically arranged pockets are supported in radial relation to a rotatable shaft with a means for deflecting the wind into these pockets and thereby rotating the shaft.

More particularly it is my object to provide a shaft having thereon a pair of spaced spider like devices with pocket members supported on these devices and with blades pivoted to the backs of the pocket members and extending into other pockets whereby the blades deflect the currents of air into the pockets.

Still a further object is to provide means for swinging the blades relative to the pockets for forming a drum like structure when it is desired that the shaft should not rotate and for presenting an irregular surface to the wind when it is desired that the shaft should rotate, the irregular surface being formed by the blades and the pockets whereby the blades deflect air into the pockets for rotating the device.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1:
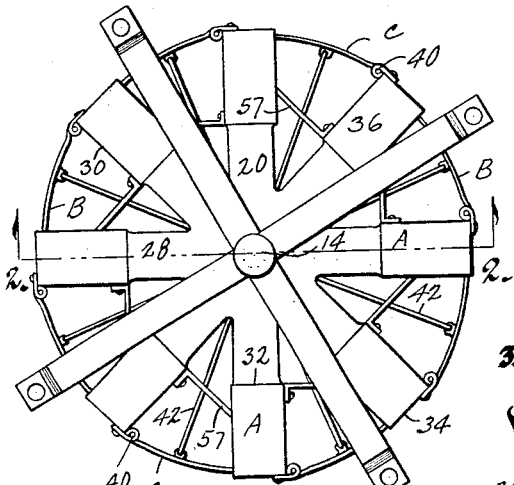
Figure 1 is a plan view of my device showing the blades in inoperative position.

On the accompanying drawings, I have used the reference numeral 10 to indicate a vertically arranged shaft. I have illustrated a frame 12 having a bearing 14 for rotatably supporting the upper end of the shaft 10 and this frame is mounted on a roof or the like 16 to which is secured a bearing 18 for supporting the lower end of the shaft.

It will, of course, be obvious that other types of frame work might be provided for rotatably supporting the shaft 10. Pinned to the shaft 10 is an upper spider 20 and a lower spider 22 is also pinned to the shaft. Incidentally a sleeve 24 extends through the spider 22 and is provided with a slot 26 so that the sleeve is slidably mounted, the slot 26 providing for movement of the sleeve past the pin which holds the spider 22 non-rotatable relative to the shaft 10.

The spiders 20 and 22 may be provided with any desirable number of arms 28 and these arms support pockets A. The pockets A consist of bottoms 30, sides 32 and 34 and ends 36 and 38. Swingably mounted by a hinge 40 to the back part of each pocket A is a blade B.

Figure 2:
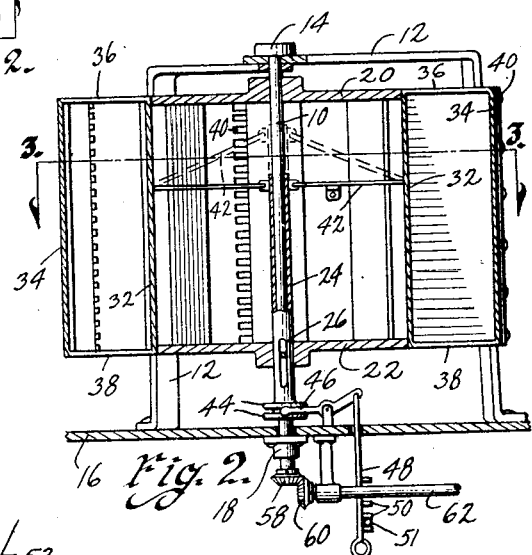
Figure 2 is a vertical section on the line 2—2 of Figure 1, illustrating the device in elevation.
Figure 3:
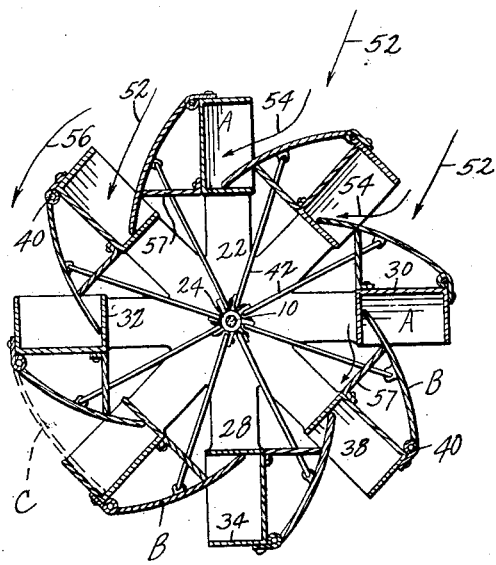
Figure 3 is a horizontal sectional view on the line 3—3 of Figure 2, illustrating the blades in operative position.
Figure 4:
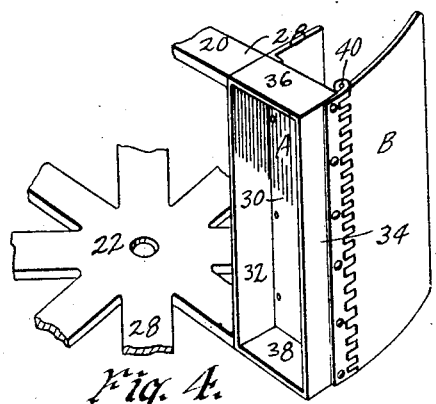
Figure 4 is a perspective view of one of the pockets showing it attached to the supporting spider and showing one of the blades hinged to the pocket.

As illustrated in Figure 3, the free vertical edge of each blade B extends into the next pocket A behind it and can swing either to the full line position illustrated or to the dotted line position indicated at C. For swinging these blades in this manner, I provide links 42 pivoted to the backs of the blades B and to the upper end of the sleeve 24. As shown in the full line position in Figure 2, these links extend horizontally and keep the blades B in the position C as illustrated in Figure 1.

When the sleeve 24 is moved upwardly, the links 42 will assume an angular position as illustrated in dotted lines in Figure 2 and for pulling the blades B inwardly as shown in Figure 3. A pair of flanges 44, a fork 46 and a control rod 48 serve to slide the sleeve 24 for the purpose of moving the blades as described. Pins 50 on the rod 48 may be provided for coacting with a stationary pin 51 for holding the blades in either operative position or inoperative position or in any intermediate position where it is desirable to control the speed of the wind wheel.

In the operation of my device, the wind may come from any angle and will have the same effect on the wheel. As indicated by the arrows 52, the wind will come from one direction and upon striking the blades B, will be deflected as indicated by the arrows 54 into the pockets A for rotating the wind wheel in the direction of the arrow 56. Deflector blades 57 may be provided on the inside of the wheel for decreasing internal resistance to rotation.

I have illustrated bevel gears 58 and 60, the gear 60 being on a shaft 62 from which power may be derived for running machinery.

It will be obvious, of course, that some changes such as a different type of driving mechanism may be made in the construction and arrangement of the parts of my device without departing from the real spirit and purpose of my invention, and it is my intention to cover by my claims, any modified forms of structure or use of mechanical equivalents, which may be resonably included within their scope.

I claim a my invention:

1. In a device of the class described a series of pockets, a series of hinged blades for deflecting air into said pockets, said blades having their free ends positioned in said pockets and each free end adapted to swing from one side of its respective pocket to the other.

2. A wind wheel comprising a shaft, a series of pockets supported thereon, a series of blades thereon to deflect air into said pockets each blade being hinged at one edge and having its free ends positioned in one of said pockets and each adapted to swing from one side of its respective pocket to the other.

3. A wind wheel comprising a shaft, a series of pockets supported thereon, a series of blades, each hinged at one end and having their free ends positioned in said pockets and each adapted to swing from one side of the pocket to the other, and means for adjusting said blades to any position to which they may be swung for regulating the amount of air deflected into said pockets and for holding the blades in such adjusted position.

4. In a device of the character disclosed, a shaft, a plurality of arms supported thereon and spaced from each other, pockets supported on said arms and blades each hinged at one edge and having their free ends extending into said pockets for deflecting air into the pockets.

5. In a device of the character disclosed, a shaft, a plurality of arms supported thereon and spaced from each other, pockets supported on said arms and arranged radially around said shaft and blades each having one of its ends hinged to the back of a pocket and its free end extended into another pocket.

6. In a device of the character disclosed, a shaft, a plurality of arms supported thereon and spaced from each other, pockets supported on said arms and arranged radially around said shaft and blades each having one of its ends hinged to the back of a pocket and its free end extended into another pocket and means for swinging said blades about their hinged connections whereby a drum like outer surface is formed by the pockets and the blades or an irregular surface is presented to the wind, the blades deflecting the wind into said pockets.

7. In a device of the character disclosed, a shaft, a plurality of arms supported thereon and spaced from each other, pockets supported on said arms and arranged radially around said shaft and blades each having one of its ends hinged to the back of a pocket and its free end extended into another pocket and means for swinging said blades about their hinged connections whereby a drum like outer surface is formed by the pockets and the blades or an irregular surface is presented to the wind, the blades deflecting the wind into said pockets, the blade swinging means comprising a sleeve slidably mounted on the shaft and having link connections to said blades.

Des Moines, Iowa, March 21, 1928.

GEORGE W. PEDLEY.